(12) United States Patent
Hom et al.

(10) Patent No.: US 10,942,683 B2
(45) Date of Patent: Mar. 9, 2021

(54) REDUCING PAGE INVALIDATION BROADCASTS

(71) Applicant: INTERNATIONAL BUSINESS MACHINES CORPORATION, Armonk, NY (US)

(72) Inventors: David Hom, Poughkeepsie, NY (US); James H. Mulder, Poughkeepsie, NY (US); Paula M. Spens, Poughkeepsie, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 14/925,317

(22) Filed: Oct. 28, 2015

(65) Prior Publication Data

US 2017/0123735 A1    May 4, 2017

(51) Int. Cl.
*G06F 3/06*    (2006.01)

(52) U.S. Cl.
CPC .......... *G06F 3/0665* (2013.01); *G06F 3/0608* (2013.01); *G06F 3/0631* (2013.01); *G06F 3/0656* (2013.01); *G06F 3/0673* (2013.01)

(58) Field of Classification Search
CPC .............. G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902;
(Continued)

(56) References Cited

U.S. PATENT DOCUMENTS 5,497,480 A     3/1996  Hayes et al.
5,581,724 A  * 12/1996  Belsan ................ G06F 11/1076
                                                   711/113
(Continued)

OTHER PUBLICATIONS

B. Pham, D. Hower, A. Bhattacharjee and T. Cain, "TLB Shootdown Mitigation for Low-Power Many-Core Servers with L1 Virtual Caches," in IEEE Computer Architecture Letters, vol. 17, No. 1, pp. 17-20, Jan. 1-Jun. 2018 (Year: 2018).*
(Continued)

*Primary Examiner* — Daniel C. Chappell
(74) *Attorney, Agent, or Firm* — Cantor Colburn LLP; Teddi Maranzano

(57) ABSTRACT

Technical solutions are described for reducing page invalidation broadcasts in a computer system. An example method includes pre-allocating a pool of large memory frames by a real storage manager. The method also includes receiving, by a virtual storage manager, an instruction from an application to allocate a memory buffer, where the instruction includes a request to back the memory buffer using large pages. The virtual storage manager, in response to the instruction, allocates the memory buffer from the pre-allocated pool of large memory frames.

14 Claims, 9 Drawing Sheets

(58) Field of Classification Search
CPC .... G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 5,956,754 A | 9/1999 | Kimmel | |
| 6,263,403 B1 | 7/2001 | Traynor | |
| 6,490,671 B1 | 12/2002 | Frank et al. | |
| 7,076,597 B2 | 7/2006 | Webb, Jr. et al. | |
| 7,206,915 B2* | 4/2007 | DeSouter | G06F 12/0292 711/203 |
| 7,251,829 B1 | 7/2007 | Pagdin et al. | |
| 7,284,100 B2 | 10/2007 | Slegel et al. | |
| 7,454,590 B2 | 11/2008 | Jordan et al. | |
| 8,032,716 B2 | 10/2011 | Heller et al. | |
| 8,285,969 B2 | 10/2012 | Khubaib et al. | |
| 8,688,951 B2 | 4/2014 | Yamada et al. | |
| 8,949,571 B2 | 2/2015 | Bennett et al. | |
| 9,390,027 B1 | 7/2016 | Miller, Jr. et al. | |
| 9,547,598 B1* | 1/2017 | Karnowski | G06F 3/067 |
| 2004/0210734 A1* | 10/2004 | Abbey | G06F 9/5016 711/173 |
| 2005/0114607 A1 | 5/2005 | Cohen | |
| 2007/0005932 A1 | 1/2007 | Covelli et al. | |
| 2007/0022148 A1* | 1/2007 | Akers | G06F 17/30138 |
| 2007/0288719 A1* | 12/2007 | Cholleti | G06F 12/023 711/170 |
| 2008/0005206 A1* | 1/2008 | Rajakarunanayake | G06F 3/0611 |
| 2009/0083496 A1 | 3/2009 | Stevens, Jr. | |
| 2012/0239896 A1* | 9/2012 | Sobel | G06F 3/0608 711/165 |
| 2013/0031333 A1 | 1/2013 | Sankaran et al. | |
| 2013/0132699 A1* | 5/2013 | Vaishampayan | G06F 11/073 711/170 |
| 2013/0254488 A1 | 9/2013 | Kaxiras et al. | |
| 2014/0040562 A1 | 2/2014 | Koka et al. | |
| 2014/0075142 A1* | 3/2014 | Hom | G06F 12/10 711/170 |
| 2014/0164732 A1 | 6/2014 | Muff et al. | |
| 2014/0181454 A1* | 6/2014 | Manula | G06F 12/0223 711/170 |
| 2014/0201489 A1* | 7/2014 | Deguchi | G06F 12/0246 711/170 |
| 2014/0201496 A1* | 7/2014 | Foster | G06F 12/08 711/209 |
| 2014/0281126 A1* | 9/2014 | Bleyer | G06F 3/061 711/103 |
| 2015/0120985 A1 | 4/2015 | Frey et al. | |
| 2017/0091097 A1 | 3/2017 | Waugh et al. | |
| 2017/0351430 A1* | 12/2017 | Blankenship | G06F 12/0808 |
| 2018/0032435 A1 | 2/2018 | Parker et al. | |

OTHER PUBLICATIONS

Chang-Kyu Lee, Jong Hyuk Choi, Kyu Ho Park and Bong Wan Kim, "Fast and cost effective cache invalidation in DSM," Proceedings Seventh International Conference on Parallel and Distributed Systems (Cat. No. PR00568), Iwate, Japan, 2000, pp. 492-497 (Year: 2000).*

List of IBM Patents or Patent Applications Treated as Related; (Appendix P), Filed May 11, 2016; 2 pages.

Robert Miller et al., "Reducing Page Invalidation Broadcasts in Virtual Storage Management", U.S. Appl. No. 15/061,455, filed Mar. 4, 2016.

List of IBM Patents or Patent Applications Treated as Related; (Appendix P), Filed Apr. 11, 2016; 2 pages.

Robert Miller et al., "Reducing Page Invalidation Broadcasts in Virtual Storage Management", U.S. Appl. No. 14/925,250, filed Oct. 28, 2015.

Borntrager, C. et al. "Providing Linux 2.6 support for the zSeries platform," IBM Systems Journal, vol. 44, No. 2, 2005, pp. 331-340.

Goto, K. et al. "On Reducing TLB Misses in Matrix Multiplication," FLAME Working Note #9, Technical Report TR02-55, Department of Computer Sciences, The University of Texas at Austin, pp. 1-19.

IBM "Integrating 64-bit C/C++ Applications With Existing 31-bit Programs," IP.Com, IP.com No. 000016458, IP.com Electronic Publication dated Jun. 23, 2003, pp. 1-4.

Matick, Re "Method for General Sharing of Data in Hybrid Memory Organization," IP.Com, IP.com No. 000050429, IP.com Electronic Publication dated Feb. 10, 2005, pp. 1-10.

List of IBM Patents or Patent Applications Treated as Related; (Appendix P), Filed May 19, 2017; 2 pages.

Miller, Robert et al., "Reducing Page Invalidation Broadcasts in Virtual Storage Management", U.S. Appl. No. 15/248,533, filed Aug. 26, 2016.

List of IBM Patents or Patent Applications Treated as Related; (Appendix P), Filed Nov. 14, 2017; 2 pages.

Miller, Robert et al., "Reducing Page Invalidation Broadcasts in Virtual Storage Management", U.S. Appl. No. 15/811,722, filed Nov. 14, 2017.

Authors et al.: IBM, ip.com "Scalable Multiprocessor Invalidation Mechanism," An IP.com Prior Art Database Technical Disclosure—IP.com Electronic Publication—Aug. 4, 2003, pp. 1-2.

Do et al. "Turbocharging DBMS Buffer Pool Using SSDs," SIGMOD '11, Jun. 12-16, 2011, Athens, Greece. pp. 1-12.

* cited by examiner

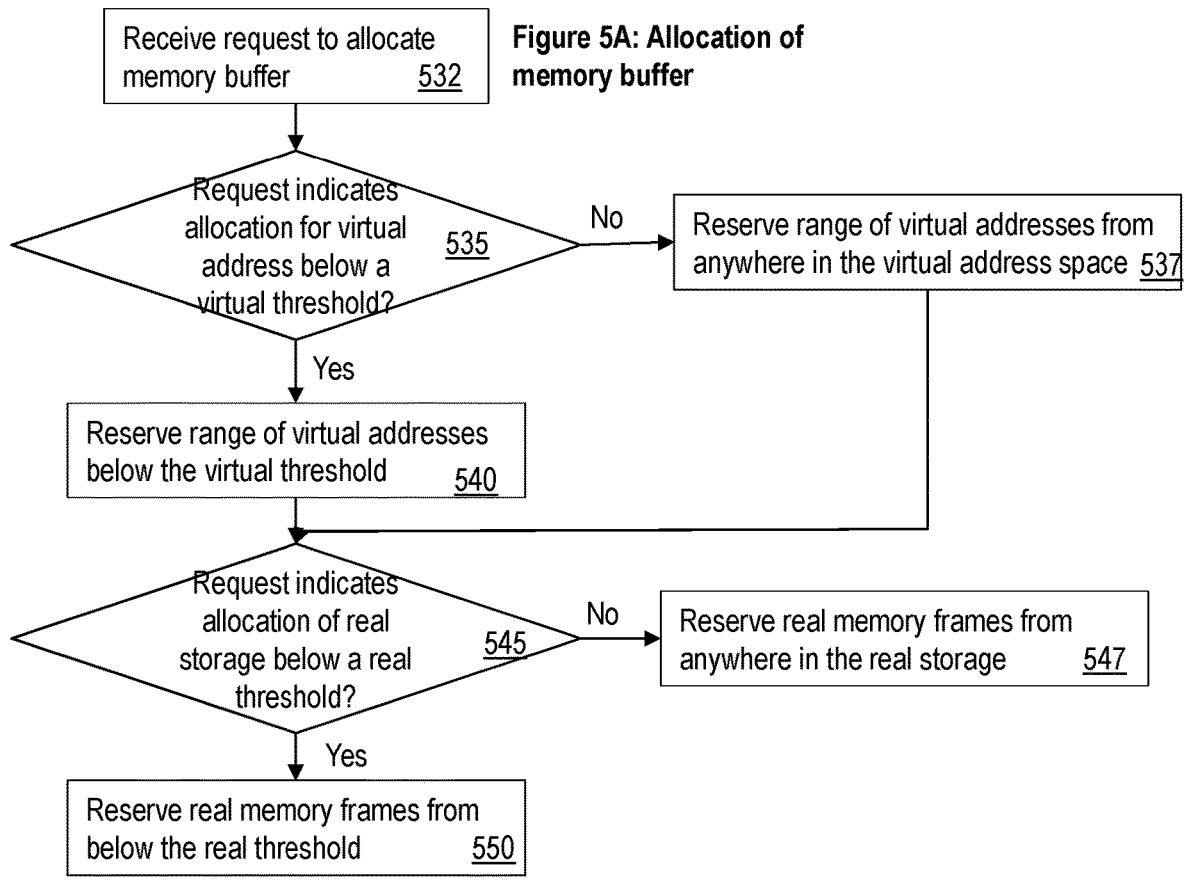

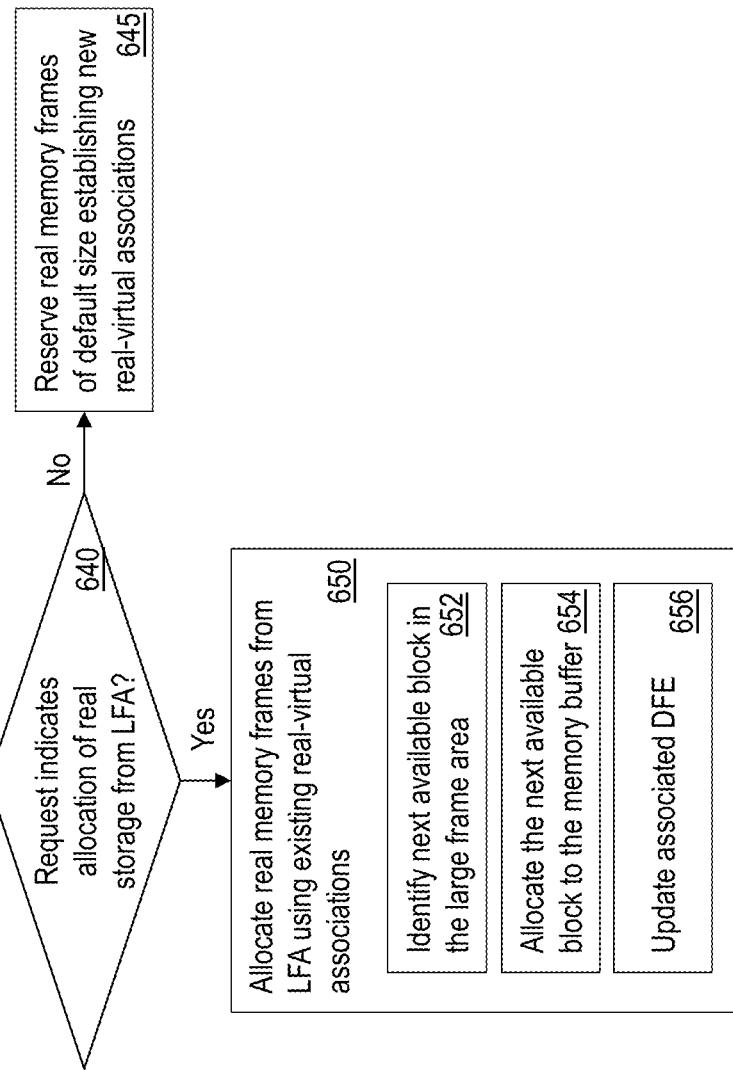
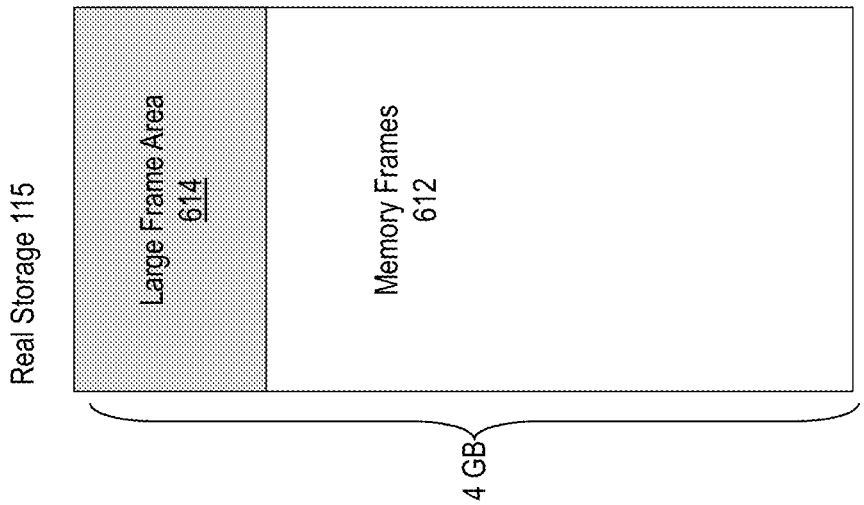

US 10,942,683 B2

REDUCING PAGE INVALIDATION BROADCASTS

BACKGROUND

The present application relates to an operating system of a computer, and more specifically, to virtual memory management of the operating system.

Operating Systems (such as z/OS™) invoke system calls to obtain and release virtual storage to perform tasks such as, scheduling service request blocks (SRBs), performing I/O, and other tasks during operation of a computer system. Further, an application executing on the computer system obtains and releases virtual storage via the system calls, and relies on the operating system to manage the virtual storage. Typically, the operating system manages allocating and freeing of the virtual storage. For example, the operating system manages an association of a virtual memory pages and corresponding real frames, the real frame being a memory space in storage of the computer. When the virtual storage is freed, if the pages are associated with real frames, the virtual to real association must be removed not only from the page table, but also from the Translation Lookaside Buffers (TLBs) associated with each active processor in the computer system. The processor performing the invalidation must issue an instruction to broadcast the virtual address being invalidated to all other processors in the system. Such a broadcast is very disruptive to ongoing work and becomes even more disruptive as the number of processors in the computer system increases.

SUMMARY

According to an embodiment, a method for reducing page invalidation broadcasts in a computer system includes pre-allocating, by a real storage manager, a pool of large memory frames. The method also includes receiving, by a virtual storage manager, an instruction from an application. The instruction is to allocate a memory buffer, where the instruction includes a request to back the memory buffer using large pages. The method also includes in response to the instruction, allocating the memory buffer from the pre-allocated pool of large memory frames.

According to another embodiment, a system includes a memory, and a processor configured to reduce page invalidation broadcasts. The processor pre-allocates, at startup, a pool of large memory frames. The processor also receives an instruction from an application to allocate a memory buffer, where the instruction includes a request to back the memory buffer using large pages. The processor, in response to the instruction, allocates the memory buffer without requesting real memory frames by reservation of a range of contiguous virtual addresses for the memory buffer, the range being a subset of contiguous virtual addresses corresponding to the pool of large memory frames.

According to yet another embodiment, a computer program product for reducing page invalidation broadcasts in a computer system includes computer readable storage medium that has computer executable instructions stored thereon. The computer readable medium includes instructions to pre-allocate, at startup, a pool of large memory frames. The computer program product also includes instructions to receive an instruction from an application to allocate a memory buffer, where the instruction includes a request to back the memory buffer using large pages. The computer program product also includes instructions to, in response to receipt of the instruction, allocate the memory buffer without requesting real memory frames by reservation of a range of contiguous virtual addresses for the memory buffer, the range being a subset of contiguous virtual addresses corresponding to the pool of large memory frames.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 5A illustrate flowcharts of using the layout of real storage in accordance with an embodiment.

FIG. 5B illustrate flowcharts of using the layout of real storage in accordance with an embodiment.

FIG. 6A illustrates layout of the real storage 115 that includes the large frame area, in accordance with an embodiment.

FIG. 6B illustrates a flowchart for using large memory frames to back default-sized virtual memory pages in accordance with an embodiment.

DETAILED DESCRIPTION

An operating system manages virtual memory of a computer, such as a multiprocessor system. The multiprocessor system executes multiple applications simultaneously. The operating system allocates each application a corresponding address space in the virtual memory. The operating system manages the address space for the application. For example, the application requests the operating system to allocate a memory buffer any time the application is in need of memory space for its operation. In response to the request, the operating system may manage a mapping between the virtual memory and physical memory.

Figure 1:
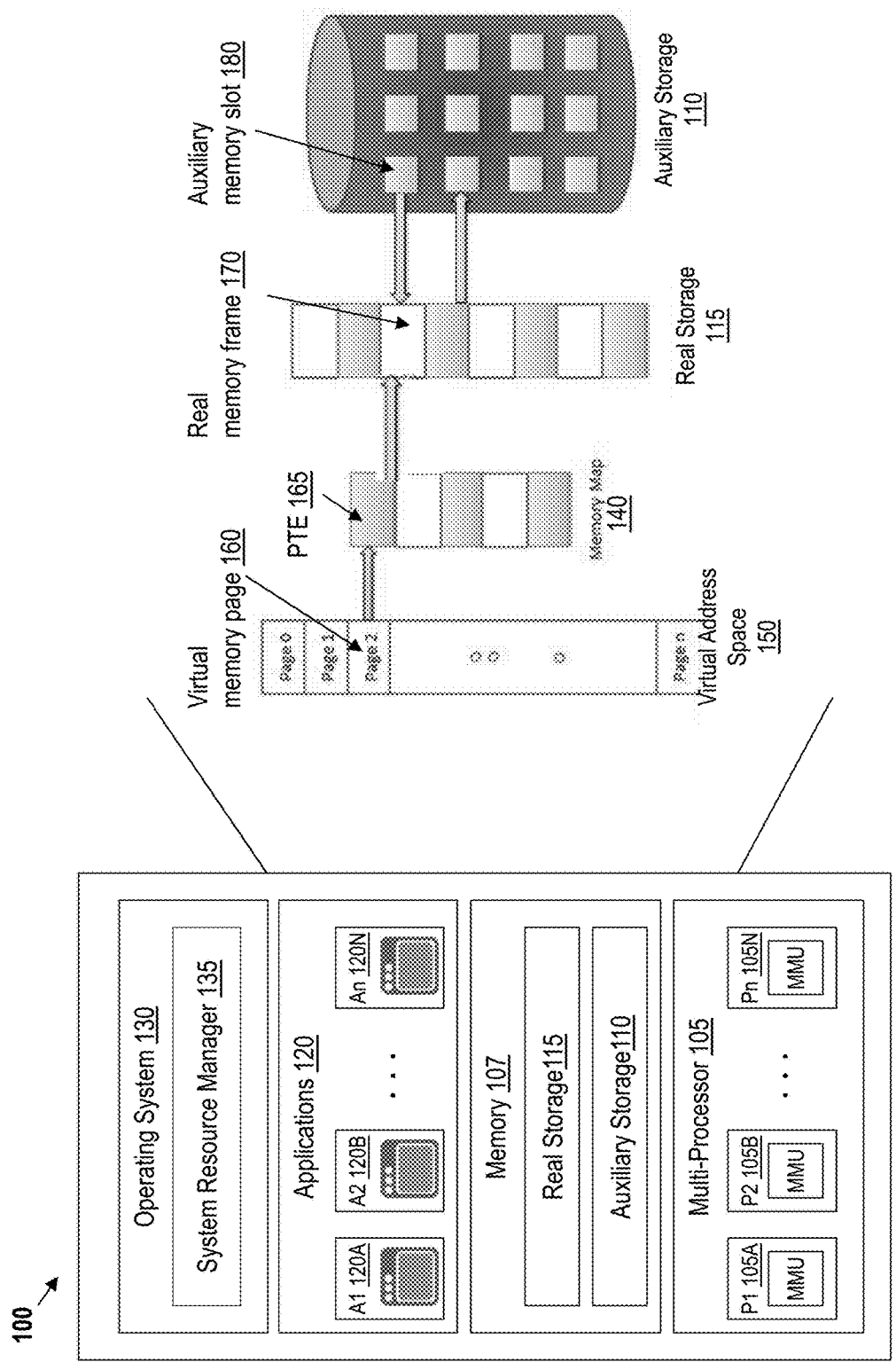
FIG. 1 illustrates virtual memory management in an example system in accordance with an embodiment.

FIG. 1 illustrates virtual memory management in an example system. A system 100 is shown that includes a multiprocessor 105, and a memory 107. The memory 107 includes an auxiliary storage 110 and a real storage 115. The system 100 may execute one or more applications 120, and an operating system 130 may manage operations of the system 100. The system 100 may include other components such as a communication interface, an input device (such as a keyboard, a mouse, a touchscreen), an output device (such as a display, a printer), and other electronic circuitry not shown in FIG. 1.

The multiprocessor 105 is a central processor of the system 100, and is responsible for execution of the operating system 130, the applications 120, and any other executable instructions. The multiprocessor 105 is operable to execute logic. The logic includes computer executable instructions or computer code embodied in the memory 107 or in other memory that when executed by the multiprocessor 105, cause the multiprocessor 105 to perform the features implemented by the logic. The computer code includes instructions executable with the multiprocessor 105. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The multiprocessor 105 may be a general processor, central processing unit, server, application specific integrated circuit (ASIC), digital signal processor, field programmable gate array (FPGA), digital circuit, analog circuit, or combinations thereof. The multiprocessor 105 is in communication with the memory 107, the operating system 130, and the applications 120, and other components of the system 100.

The multiprocessor 105 includes a plurality of processors P1-Pn 105A-105N. Each processor may operate independently. Alternatively or in addition, the processors 105A-105N may operate in conjunction. Each processor, among other circuitry, includes a memory management unit (MMU). The MMU is a computer hardware unit that translates a virtual memory address to physical memory address. The MMU, in addition, may be responsible for memory protection, cache control, and bus arbitration.

The memory 107 includes non-transitory computer storage medium. The memory 107 stores control instructions and data of the operating system 130 and the applications 120 that are executable by the multiprocessor 105. In addition, the memory 107 may contain other data such as images, videos, documents, spreadsheets, audio files, and other data that may be associated with operation of the system 100.

The memory 107 includes real storage 115, which is volatile memory such as dynamic random-access memory (DRAM), static random-access memory (SRAM), or any other type of volatile memory or a combination thereof. The memory 107 also includes auxiliary storage 110, which is non-volatile memory such as hard disks, magnetic tape, flash memory, or any other type of non-volatile memory or combination thereof.

The applications 120 include software applications A1-An 120A to 120N. The multiprocessor 105 may be executing the applications 120. The operating system 130 is responsible for managing the operations of the system 100. The operating system 130 may be any operating system such as z/OS™, WINDOWS™, LINUX™, OS/X™, or any other operating system. The operating system 130 includes a system resource manager 135 and a storage manager. The system resource manager 135 manages the resources among the applications 120 that are being executed on the system 100. In this regard, the system resource manager 135 monitors the resources currently allocated and used by the applications 120. The system resource manager 135 may request an application to release resources that were allocated for that application, and allocate the freed resources to another application. The system resource manager 135, thus, balances the resources among the applications 120. To this end, the system resource manager 135 may include the storage manager that maintains statistics about the allocation and usage of the resources by the applications 120. Among other resources, the storage manager under the direction of the System Resource Manager 135 may manage and balance the allocation and use of memory 107, particularly real storage 115, by the applications 120. The storage manager is responsible for providing interfaces to the application for obtaining and freeing virtual storage, for backing virtual storage with real storage and for paging or swapping virtual storage backed in real to auxiliary (secondary) storage. The system resource manager uses storage usage statistics provided by the storage manager to instruct the storage manager to balance the allocation and use of real storage by the application.

The applications 120 may, together, use or require more real storage 115, than what is physically available in the system 100. Hence, the system 100 may use virtual memory management for executing the applications 120. Using virtual memory management, the operating system 130 maps memory addresses used by an application, called virtual addresses, into physical addresses in the real storage 115.

For example, as shown in FIG. 1, the operating system 130 allocates a virtual address space for each of the applications 120. A page is a block of contiguous virtual memory addresses of a predetermined size and a frame is a block of contiguous physical memory addresses of a predetermined size. The MMUs of the multiprocessor 105 map a virtual address in the virtual memory 150 to a physical address in the real storage 115. The MMUs maintain a memory map 140 that associates the virtual address with the physical address or memory location.

For example, the memory map 140 may include an in-memory table of items called a page table per application 120A. The page table contains a page table entry (PTE) per page in the virtual memory 150, to map a virtual page to a physical page. The MMUs uses an associative cache, called a translation lookaside buffer (TLB), to avoid the necessity of accessing Dynamic Address Translation Tables (DAT tables) every time the application references virtual memory. Each MMU may have its own TLB. In an example, the operating system 130 may load into the real storage 115, the pages that are being used by an application, such as the application 120A. The operating system 130 may swap pages in the real storage 115 into the auxiliary storage 110. The auxiliary storage 110 may be a separate non-volatile storage designated as the auxiliary storage 110, or a section of a non-volatile storage delineated as a swap file, or a swapping partition.

In an example, the application 120A allocates and deallocates a memory buffer. The application 120A requests the operating system 130 to allocate and deallocate the memory buffer. In response to a request to allocate the memory buffer, the operating system 130 allocates one or more pages of the virtual memory 150 to the memory buffer. For example, the operating system 130 allocates a virtual memory page 160 in the virtual address space. The operating system maps the virtual memory page 160 with a corresponding real memory frame 170 in the real storage 115. The operating system 130 records the mapping in the memory map 140. For example, the operating system 130 may create or update a PTE 165 in the memory map 140. The mapping may be stored in the TLB of a subset of the processors of the multiprocessor 105. The operating system 130 may swap the real memory frame 170 into an auxiliary (or secondary) memory frame 180 in the auxiliary storage 110.

Subsequently, the application 120A may request the operating system 130 to deallocate the memory buffer. Consequently, the operating system 130 may deallocate the virtual memory page 160. When the virtual memory page 160 is freed, if the page is associated with the real memory frame 170, the virtual to real association in the PTE is typically removed not only from the page table, but also from the TLBs associated with each processor. For example, the operating system 130 may issue an Invalidate Page Table Entry instruction, such as the IPTE instruction of z/Architecture™, which broadcasts an invalidation signal for the virtual address being invalidated to all the processors in the system 100. The IPTE instruction not only invalidates a virtual to real mapping in the page table entry, but also signals every processor to update their TLBs should they contain a mapping of the page being invalidated. This broadcast can be disruptive to ongoing work and becomes even more disruptive as the number of processors increase.

The system 100 may reduce the disruptive broadcasts associated with page invalidations using an instruction, such as the IPTERANGE instruction in Z/ARCHITECTURE™, to invalidate a range of primary memory pages with a single invalidation broadcast to the processors. Similarly, the IDTE instruction invalidates all storage associated with a higher level DAT structure (such as a single segment in z/Architecture) with a single broadcast. However, despite usage of such instructions the number of invalidation broadcasts still depends on the behavior of the application 120A. For example, if the application 120A obtains and frees a single virtual memory page, such as the virtual memory page 160, at a time, the number of IPTE invocations does not change. Additionally, even if the application 120A frees more than a single virtual memory page at a time, if it subsequently obtains pages at the same virtual storage addresses, the system 100 incurs the overhead of reobtaining real storage to back the pages as well as repopulating the cache and TLB.

Figure 2:
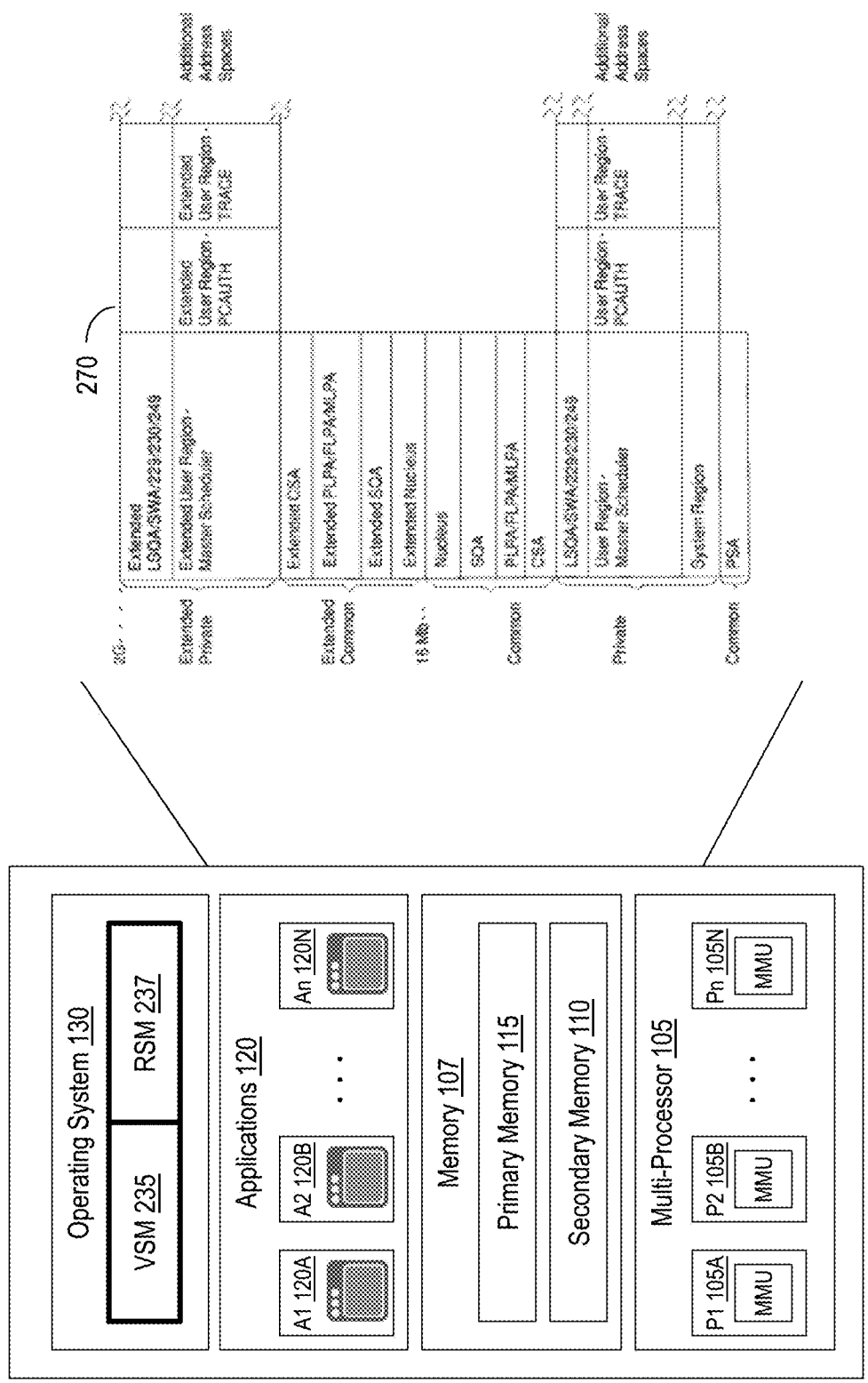
FIG. 2 illustrates an example view of a system using virtual memory management in accordance with an embodiment.

FIG. 2 illustrates an example view of the system 100 using virtual memory management. The virtual storage 270 includes the virtual address spaces that the operating system 130 allocates for the respective applications 120. Each virtual address space in the virtual storage 270 is the span of memory addresses available to the corresponding application with a dynamic address translation (DAT) feature enabled. The operating system 130 includes a virtual storage manager (VSM) 235. The VSM 235 supervises allocation and deallocation of virtual memory pages. The operating system 130 further includes a real storage manager (RSM) 237. The RSM 237 supervises allocation and deallocation of real memory frames corresponding to the virtual memory pages.

Figure 3:
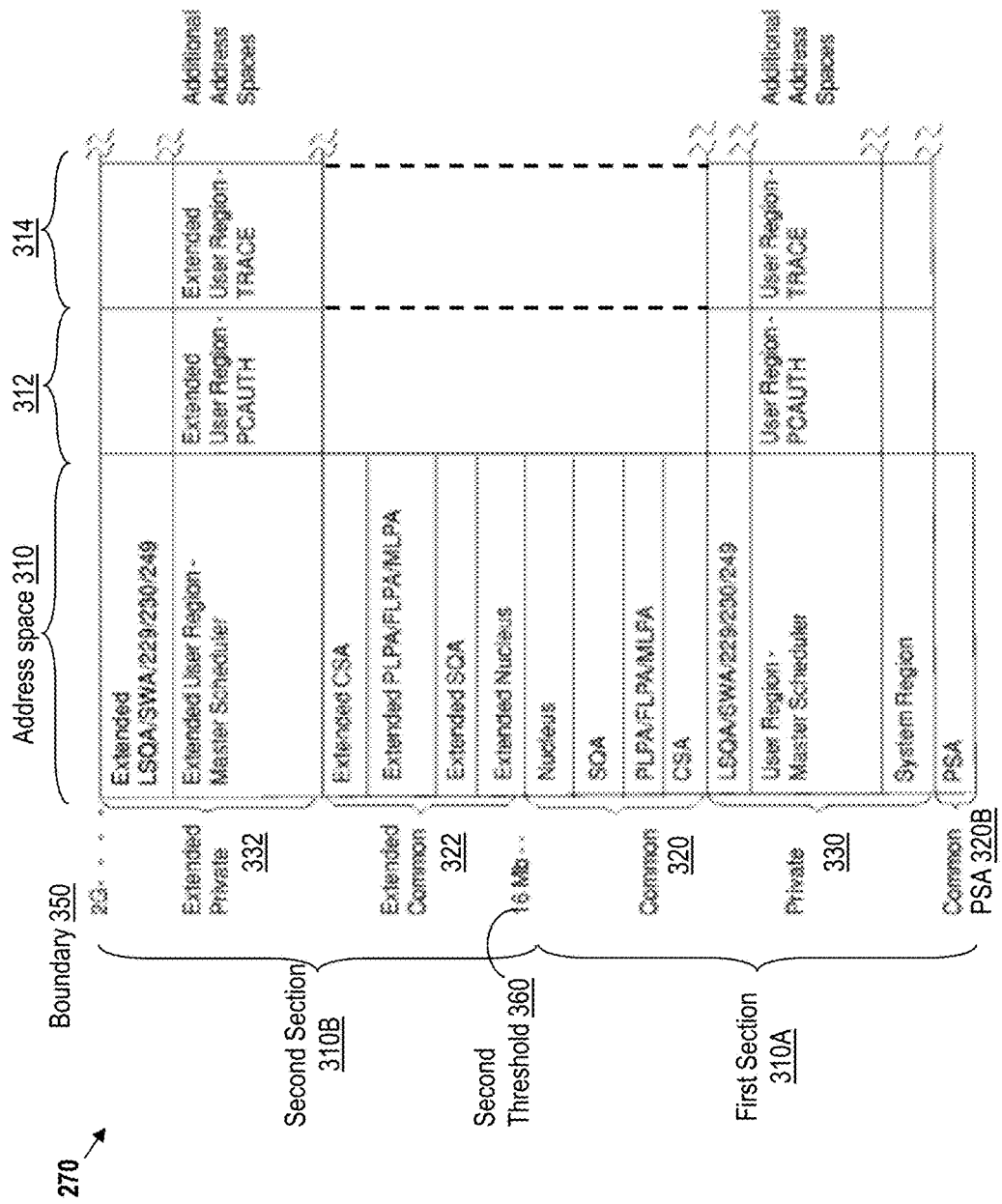
FIG. 3 illustrates an example virtual storage in accordance with an embodiment.

FIG. 3 illustrates the example virtual storage 270. The virtual storage 270 includes user addressable virtual address spaces 310, 312, and 314. Each user addressable virtual address space 310, 312, and 314 is of the same size based on the boundary 350. For example, the VSM 235 may control use of memory addresses that are below the boundary 350. In the illustrated example, the VSM 235 has a predetermined boundary of 2 gigabytes (GB). In another example, the VSM 235 may manage a user addressable virtual storage that is 4 GB in size. The size of the user addressable virtual storage 310 managed by the VSM 235 may be user configurable. For example, a number of bits used by the VSM 235 to address the user addressable virtual address space 310 controls the size of the user addressable virtual address space 310. The VSM 235 controls a task's request to allocate and free portions of the storage in the user addressable virtual address space 310. The user addressable virtual address space 310 may serve as a master scheduler address space for the operating system 130. Alternatively or in addition, a job entry subsystem (JES) of the operating system 130 may use the user addressable virtual address space 310. In another example, the user addressable virtual address space 310 may be an address space for an operating system component, such as for allocation, system trace, system management facilities (SMF), and dumping services. In yet another example, the user addressable virtual address space 310 may be used for each user of the system in a batch or a time-sharing option/extension (TSO/E) mode.

The user addressable virtual address spaces 310, 312, and 314 are each divided into two sections by a second memory threshold 360. In the illustrated case, the second memory threshold 360 is at 16 megabytes (MB). The second memory threshold 360 divides the user addressable virtual address space 310 into a first section 310A and a second section 310B.

The first section 310A of the virtual storage space includes a common area 320 and a private area 330 and a common PSA area 320B. The second section 310B includes an extended common area 322 and an extended private area 332. The common area 320 and common PSA area 320B contains system control programs and control blocks such as a Prefixed storage area (PSA), a Common Service Area (CSA), a Pageable Link Pack Area (PLPA), a Fixed Link Pack Area (FLPA), a Modified Link Pack Area (MLPA), a System Queue Area (SQA), and a Nucleus, which is fixed and nonswappable. In the illustrated example, a storage area in the common area 320 (below 16 MB) has a counterpart in the extended common area 322 (above 16 MB) with the exception of the PSA.

Each user addressable virtual address space 310, 312, and 314 corresponds to a respective application or a respective user. Thus, one or more applications or users share the virtual storage, except the private area 330 and the extended private area 332. In other words, each user addressable virtual address space 310, 312, and 314 uses the same common area 320. Portions of the common area 320 are paged in and out as the demands of the system change and as new user jobs (batch or time-shared) start and old ones terminate. Thus, multiple address spaces share the common area 320 and the extended common area 322, but the virtual address space 310 has its own private area 330 and extended private area 332.

The private area 330 contains a local system queue area (LSQA), a scheduler work area (SWA), subpools 229, 230, and 249 (the authorized user key (AUK) area), a predefined system region area, and either a V=V (virtual=virtual) or V=R (virtual=real) private user region for running programs and storing data. The predefined system region area, in an example, may be 16 kilobytes (KB). The private area 330 (except LSQA) is pageable unless a user specifies a V=R region. If assigned as V=R, the actual V=R region area (excluding SWA, the predefined system region area, and subpools 229, 230, and 249) is fixed and nonswappable. The private area allows allocation only by authorized programs/applications having appropriate storage protect keys. A subpool is a virtual storage area with the same properties regarding storage key, pageable or fixed, private or common, fetch protected or not, and so on. The LSQA contains tables and control blocks queues associated with the address space.

The VSM 235 manages the private area 330 below the second threshold 360 and the extended private area 332 above the second threshold 360, up to the boundary 350. The private area 330 virtual storage use of the user addressable virtual address space 310 may become such that the potential for exhaustion increases and impacts the application that is running in that user addressable virtual address space 310. The exhaustion may result in eventual failures for subsequent storage requests. System address spaces encountering private area storage exhaustion may have an adverse effect on the health of the entire system.

Typically, the VSM 235 manages allocation and deallocation of memory addresses in response to an instruction from an application to allocate or free a memory buffer. For example, the VSM 235 responds to requests to obtain and free memory buffers in the virtual memory. VSM 235 also manages storage allocation for an application that runs in real memory, rather than virtual memory. Real memory is allocated to code and data when they are loaded in virtual memory. As an application runs, the application may request more memory by using a system service, or a system call such as a GETMAIN macro. The application may release the memory allocated with another system call, such as a FREEMAIN macro.

For example, in response to a request to allocate a memory buffer, the VSM 235 reserves a range of virtual addresses for the requested memory buffer. The range of virtual addresses reserved for the memory buffer is from the virtual address space 310 corresponding to the application that requested the memory buffer.

Each running application (or user) is associated with a separate address space. The range of addresses in each address space is based on the operating system's address-bit capability. For example, the operating system 130 may support 31-bit or a 64-bit (or any other) range of addresses. FIG. 3 illustrates the operating system 130 using 31-bit addressing that provides each virtual address space, and thus each application, a size of 2 GB (2^31). However, a portion of the virtual address space is reserved as the private storage for the application that contains the control blocks described herein. Thus, in response to the request for a memory buffer from an application, the VSM 235, reserves the addresses that span a requested size of the memory buffer from the common storage of the virtual address space 310 associated with the application. Thus, if the virtual address space 310 is 2 GB in size (31-bit addressing), the range of virtual addresses is below the 2 GB size limit. Alternatively, if the virtual address space 310 is 16 MB in size (24-bit addressing), the range is below the 16 MB size limit.

The VSM 235 keeps track of the map of the virtual storage 270 for each address space. In so doing, the VSM 235 divides the address space 310 as a collection of subpools, each containing a predetermined number of virtual pages. For example, if the virtual page is 4 KB, the virtual address space 310 is 2 GB in size, and a subpool contains 2048 virtual pages, the virtual address space 310 contains 256 subpools. The subpools are logically related areas of the virtual address space identified by a unique identifier, such as the numbers 0 to 255 in the above example. Some subpools (such as subpool 229) may be predefined for use by the operating system 130.

The operating system 130, using the VSM 235 and the RSM 237 maps (or backs) the virtual memory pages with the real memory frames. The real storage 115 may be smaller, larger, or equal to the size of the virtual address space 310. For example, the real storage 115 may be 512 MB, 2 GB, 4 GB, 1 terabyte (TB), or any other size. The RSM 237 allocates real memory frames from the real storage 115, for the virtual memory pages reserved by the VSM 235.

As described herein, by using paging, when a requested virtual address of an application is not in the real storage 115, an interruption is signaled and the operating system 130 brings the required page into the real storage 115. The RSM 237 manages the real storage 115. The RSM 237 manages the paging activities—such as page-in, page-out, and page stealing—helps with swapping an address space in or out. RSM 237 also performs page fixing, which is marking pages as unavailable for stealing. When a page-in or page-out is required, the RSM 237 locates the corresponding real memory frames and auxiliary memory slots. In an example, the RSM 237 may work with an Auxiliary Storage Manager (ASM) (not shown) to identify and use the auxiliary memory slots.

The operating system 130 may facilitate the application 120a to identify specific portions of the virtual address space 310 and the real storage 115 to use when allocating the memory buffer. For example, the application 120a may request that the memory buffer be allocated virtual addresses below 2 GB, and the real memory frames be below the 2 GB mark in the real storage. Alternatively, the application 120a may request that the virtual addresses be below the 2 GB threshold, but the real memory frames may be from above the 2 GB mark. Any other combination and/or thresholds may be used in other examples.

Figure 4:
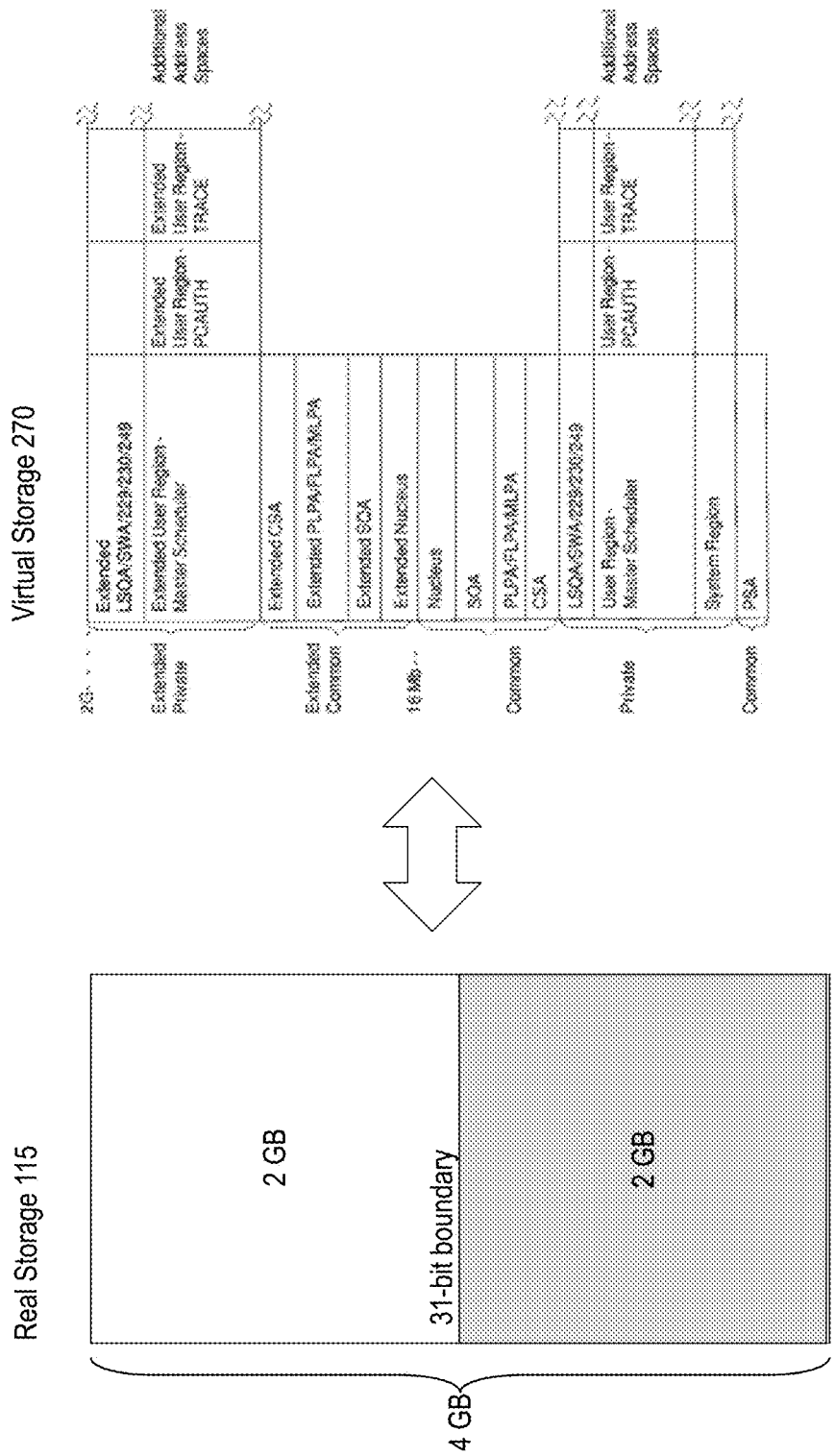
FIG. 4 illustrates an example mapping between real storage and virtual storage in accordance with an embodiment.

FIG. 4 illustrates an example mapping between the real storage 115 and the virtual storage 270. As shown the virtual address spaces in this case are 2 GB each, while the real storage is 4 GB. FIGS. 5A and 5B illustrate flowcharts of using the example layout of the real storage 115 in FIG. 4.

As illustrated in FIG. 5A, the VSM 235, in response to receiving a request to allocate a memory buffer, determines if the request indicates whether to use a specific portion of the virtual address space 310 or the real storage 115, as shown at blocks 532, 535, and 545. In an example, the application 120a requests the memory buffer be allocated from below (or above) a virtual threshold. In z/OS™, the virtual threshold is 16 MB or 2 GB. The application 120a may specify whether the operating system 130 allocates the memory buffer virtual addresses from below or above one of the virtual thresholds that the operating system 130 facilitates. For example, in z/OS™, GETMAIN LOC(31,31) caller requests that a memory buffer be allocated with virtual addresses below 2 GB virtual threshold (31-bit), which is anywhere within the 2 GB address space 310, as shown at block 537. Also, the RSM 237 uses corresponding real memory frames from below 2 GB real threshold (31-bit boundary). The 'real threshold' indicates an address boundary in the real memory, where the application 120a requests the real memory frames allocated to be from below the real threshold. Alternatively, a GETMAIN LOC(24,64) caller requests that the memory buffer be allocated with virtual addresses below 16 MB virtual threshold (24-bit), as shown at block 540 and corresponding real memory frames be from below a 16 EB real threshold (64-bit). In case of the specific example of FIG. 4, the first caller uses real memory frames from the first 2 GB, as shown at block 550 while the second caller results in the real memory frames from anywhere in the real storage 115, as shown at block 547. In either case, when the VSM 235 receives a request to free the memory buffer, an invalidation command is broadcast across the processors as described herein.

Thus, in response to the request to allocate a memory buffer from an application 120a, the VSM 235 may reserve a range of virtual addresses for the memory buffer from the virtual address space 310 corresponding to the application 120a. The VSM 235 further requests the RSM 237 to associate real memory frames to the memory buffer. The VSM 235 maintains a mapping between the virtual addresses of the memory buffer and the corresponding real memory frames. During the execution of the application 120a, the RSM 237 may page-out and page-in the real memory frames back and forth from the auxiliary storage 110. Subsequently, in response to a request to free the memory buffer, the VSM 235 may request the RSM 237 to disassociate the real memory frames from the range and deallocates the memory buffer from the range of addresses. This results in disrupting the operation of the system due to invalidation broadcasts to remove the virtual to real association in the PTE, since the association is removed not only from the page table, but also from the TLBs associated with each processor.

The technical solutions described herein reduce page invalidation broadcasts using 31-bit Common 1 MB Pages. The technical solutions aid an operating system that uses 31-bit addressing for the virtual storage. The technical solutions facilitate the operating system to improve management of 31-bit common memory using large pages.

For example, a page may have a predetermined size, such as 4 KB. The predetermined size may be setup as a parameter that is accessed during system startup. A large page, also referred to as a 'huge' page or a 'super' page, is a page that has a second predetermined size larger than the predetermined page size. For example, in z/OS™ the standard page is 4 KB of contiguous memory space, while the large page is 1 MB of contiguous memory space. For example, the large page may be viewed as 256 pages of 4 KB each. Using large pages reduces number of TLB lookups, thus reducing time for memory access. For example, in case of a 2 GB address space with 4 KB pages, the address space contains 524,288 pages to look up (2 GB/4 KB). If each PTE consumes 8 bytes, the operating system 130 looks up 4 MB (524,288×8 bytes) of data to identify the real memory frame corresponding to a page. In case of a large page of 1 MB, the address space of 2 GB contains 2,048 pages to look up (2 GB/1 MB), and consequently, only 16 KB (2,048*8 bytes) of PTE data to identify the real memory frame. Thus, a large page requires only one entry in the TLB, as compared to the larger number of entries required for an equivalent number of 4 KB pages. Accordingly, a single TLB entry improves TLB coverage for exploiters of large pages by increasing the hit rate and decreasing the number of TLB misses that an application incurs.

Hence, large pages improve performance in some cases. For example, large pages provide performance value to applications that can generally be characterized as memory access-intensive and long running. These applications meet the following criteria that the applications reference large ranges of memory, exhaust the private storage areas available within the address space (such as the IBM® WebSphere® application), or use private storage above the address space limit (such as IBM DB2® software).

Accordingly, to facilitate selected applications to improve performance using large pages, the operating system 130 provides a separate large frame area. The large frame area includes a pool of large memory frames. The large frame area is used for the large pages of predetermined sizes, such as 1 MB, 2 GB or any other predetermined size. The operating system 130, at startup may access a parameter that specifies the amount of real memory to allocate for the large frame area. For example, the amount of real memory to allocate for the large frame area may be specified as a number of large pages, or a percentage of total real memory available, or as a specified amount of memory, or in any other manner.

FIG. 6A illustrates layout of the real storage 115 that includes the large frame area, according to an embodiment. For example, the real storage 115 reserves a portion of the real memory frames as a large frame area 614 that contains a pool of large memory frames, such as of size 1 MB. The rest of the real storage 115 contains real memory frames 612 of a default size, such as 4 KB, which is the same size as a virtual memory page. In another example, the real storage 115 includes two or more large frame areas.

The technical solutions facilitate the operating system 130 to use the large memory frames, such as the 1 MB frames to back default-sized virtual memory pages, which are 4 KB. In another example that has two large frame areas, the technical solutions facilitate the operating system 130 to use large memory frames from a first large memory frames to back default-sized virtual memory pages, and large memory frames from the second large frame area to back large virtual memory pages, which are 1 MB. Thus, in the illustrated example, 31-bit common memory pages, which are 4 KB in size, are backed using 1 MB large memory frames from the large frame area 614. The operating system 130 uses the large memory frames to back the default sized virtual memory pages in response to the application 120a requesting the use of the large memory frames, such as by using a keyword in the memory allocation request.

FIG. 6B illustrates a flowchart of example logic for using the large memory frames to back default-sized virtual memory pages, such as 31-bit common storage. The operating system 130 pre-allocates a large frame area containing the large memory frames that are to be used to back default-sized virtual memory pages of the common storage areas of the virtual address spaces, as shown at block 620. For example, the RSM 237 reserves a predetermined number of contiguous default-sized memory frames based on a startup parameter, such as PARMLIB, that the installation can setup. The startup parameter indicates to the RSM 237 how many large memory frames the operating system 130 is to reserve in the pool of large memory frames for backing 31-bit default-sized pages. The number of default-sized frames to reserve for the large frame area is then determined by (#LargeMemoryFrames×SizeOfLargeMemoryFrame/SizeOfDefaultMemoryFrame). For example, if the startup parameter indicates 8 large memory frames, which are 1 MB and default memory frame is 4 KB, then the number of default-sized memory frames to allocate is 8×1 MB/4 KB=2048. The RSM 237 uses 256 contiguous default-sized memory frames as a single large memory frame of 1 MB in this case. The large frame area used to back the 31-bit common storage may be referred to as 31-bit common large page area.

The operating system 130 ensures that the large frame area thus allocated is not used by applications, without a predetermined keyword. For example, attempting to protect, fix, page out portions of the large frame area results in the demotion of the large frames, by breaking the large frame into contiguous default-sized pages.

Once the RSM 237 has reserved the large frame area, the RSM 237 invokes an instruction for initially reserving the virtual storage addresses for the entire 31-bit common large page area and establishing virtual-real associations for the large frame area 614, as shown at block 622. For example, in z/OS™ the RSM 237 uses the STORAGE macro to reserve the virtual addresses. Using the virtual address returned from the storage request, the RSM 237 initializes the internal structures associated with the 31-bit common large page area, and establishes the virtual to real association between the large frames and the virtual addresses. Subsequently, the RSM 237 invokes an instruction to mark the entire 31-bit common large page area and the corresponding virtual storage addresses as being available to any operating system component interested in requesting 31-bit common storage that is to be backed with large memory frames. For example, in z/OS™ the RSM 237 invokes the STORAGE macro to mark the virtual addresses as available.

Figure 7:
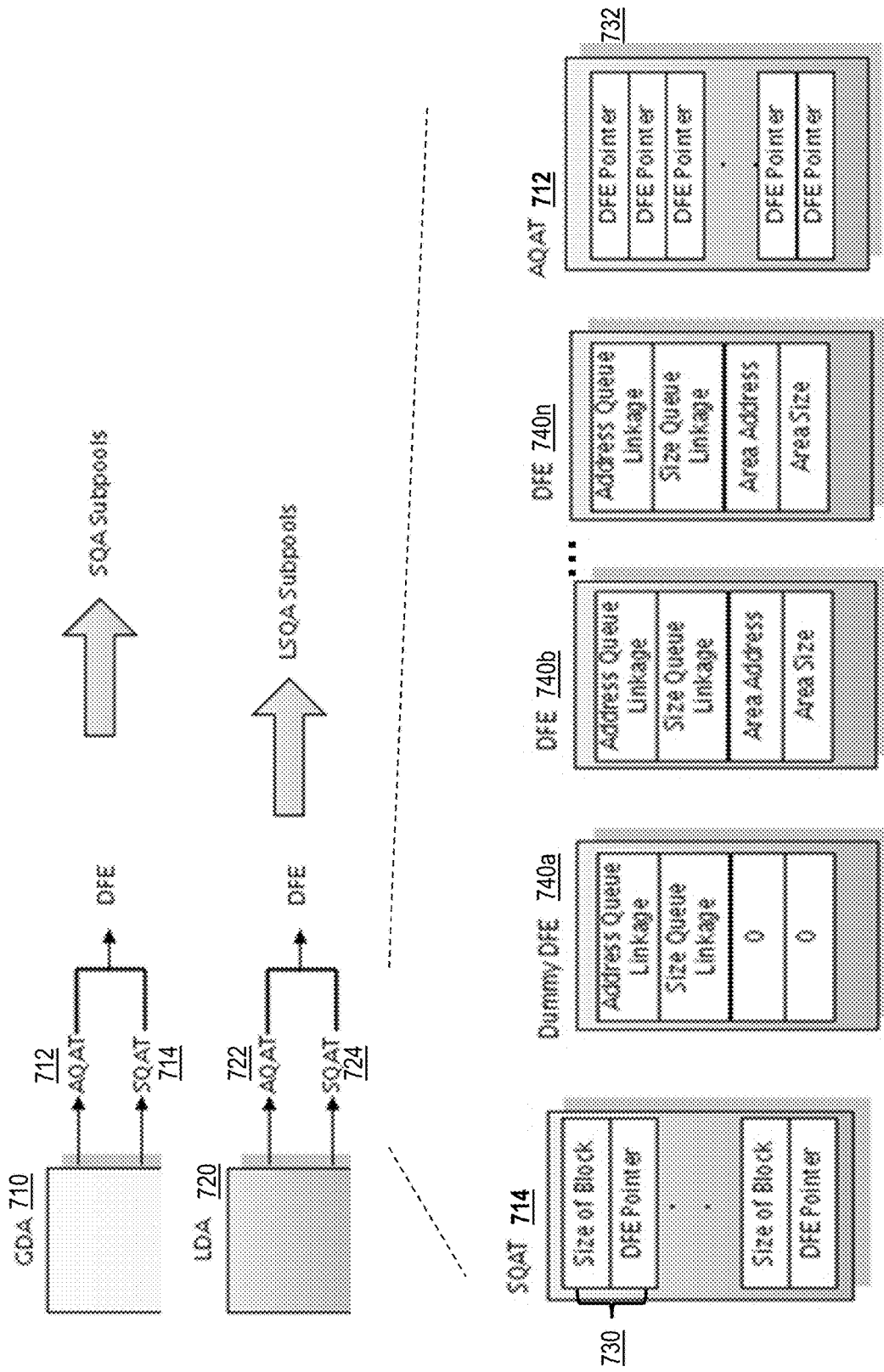
FIG. 7 illustrates example control blocks maintained by the VSM in accordance with an embodiment.

FIG. 7 illustrates example control blocks that the VSM 235 maintains to identify availability of virtual storage in the virtual address space 310, and to maintain a virtual to real association between the virtual memory addresses and the real memory frames in the real storage 115. For example, the VSM 235 maintains a Global Data Area Block (GDA) 710 and a Local Data Area Block (LDA) 720 that contain information to anchor subpool queues, such as a SQA subpool queue and a LSQA subpool queue. The GDA 710 and the LDA 720 include pointers to both a Size Queue Anchor Table (SQAT) 714 and 724, and an Address Queue Anchor Table (AQAT) 712 and 722, respectively. The GDA 710 and the LDA 720 include other information that is not illustrated. The SQAT 714 is used when allocating storage for the memory buffer and the AQAT 712 is used when freeing the memory buffer.

A SQAT entry 730 includes a Descriptor Free Element (DFE) pointer corresponding to a subpool, and available free storage in the subpool. For example, the SQAT entry 730 points to a DFE 740, from among multiple DFEs 740a-740n. The DFE 740 represents a particular subpool in the virtual address space 310. The DFE 740 indicates the available contiguous memory in the corresponding subpool and the virtual address of the next free block, which is the lowest virtual address in the next free block. The entries in the SQAT 714 are sorted according to size of available storage in each subpool, which makes locating a virtual storage area for an allocation request more efficient. For example, if the request is for 2 KB, the VSM 235 skips the smaller sized SQAT entries until a SQAT entry that contains free area of 2 KB or more is found. The VSM 235 updates the SQAT entry 730 to reflect the size of the memory buffer being allocated. For example, if the DFE 740 had 5 KB available, and the request is to allocate a memory buffer of 2 KB, the DFE 740, upon allocation, is update to indicate that 3 KB virtual storage is available in the corresponding subpool.

An AQAT entry 732 points to a DFE, from the multiple DFEs 740a-740n, the same DFEs that are pointed to by the SQAT entries. The entries in the AQAT 712 are sorted according to 'address' (instead of size in SQAT) so that locating a virtual storage area for a given free request is more efficient. Typically, a free request indicates the address of the memory buffer that is to be freed. For example, if the request is to free virtual storage address 7F001000x, the VSM 235 skips to the AQAT entry 732 that maps to that virtual address and identifies the virtual to real association for the memory buffer. The VSM 235 then issues the invalidation broadcast to remove the virtual to real association for the identified virtual storage address and further updates the DFE.

The technical solutions facilitate the VSM 235 to create a dummy DFE 740a for virtual addresses that are mapped to the large frame area 614. A pointer to the dummy DFE 740a is maintained at the first position in the AQAT 712.

The RSM 237 maintains and provides usage counts of the 31-bit common storage requests to allow the operating system 130 to fine tune the startup parameter, PARMLIB, later. For example, the RSM 237 may maintain a count of a total number of memory allocation requests to use the large memory frames to back default-sized 31-bit common storage. The RSM 237 may further maintain a count of successful and a count of failed requests from such requests.

Referring to FIG. 6, the VSM 235, in response to receiving the request to allocate a memory buffer from the application 120a, determines if the application requested use of large memory frames for backing the virtual memory allocated to the memory buffer, as shown at blocks 624 and 640. For example, the VSM 235 receives an allocation request such as GETMAIN LOC(31,PAGEFRAMESIZE1MB), which calls for 31-bit common subpools memory backed by 1 MB frames.

If the request does not request backing by large frames, the VSM 235 proceeds to allocate virtual storage from one of the available subpools and establishing new virtual-real associations for the virtual storage, as shown at block 645. The VSM 235 uses the SQAT 714 to determine the available virtual storage from the subpools in the virtual address space 310, as described herein (for example, see FIG. 5A).

Alternatively, if the request indicates that large memory frames from the large frame area 614 are to be used to back the memory buffer, the VSM 235 uses the virtual addresses from those allocated to the large frame area, which are already associated with the real memory frames from the large frame area, as shown at block 650. For example, the VSM 235 uses a DFE 740 to identify the next available block of storage in the large frame area that can be allocated to the memory buffer, as shown at block 652. For example, the VSM 235 maintains the address queue and the size queue in the DFE 740 and keeps track of the available storage blocks within the large frame area 614. The VSM 235 allocates the virtual address of the available block identified to the memory buffer, as shown at block 654. The virtual to real association of the virtual pages in the large frame area is not broken, and thus, the VSM 235 uses the large memory frames to back the virtual pages associated with the memory buffer. Thus, the VSM 235 allocates the memory buffer without a call to the RSM 237. The VSM 235 updates the DFE associated with the virtual pages that are in turn associated with the memory buffer, to update the available storage in the large frame area, as shown at block 656.

Figure 8:
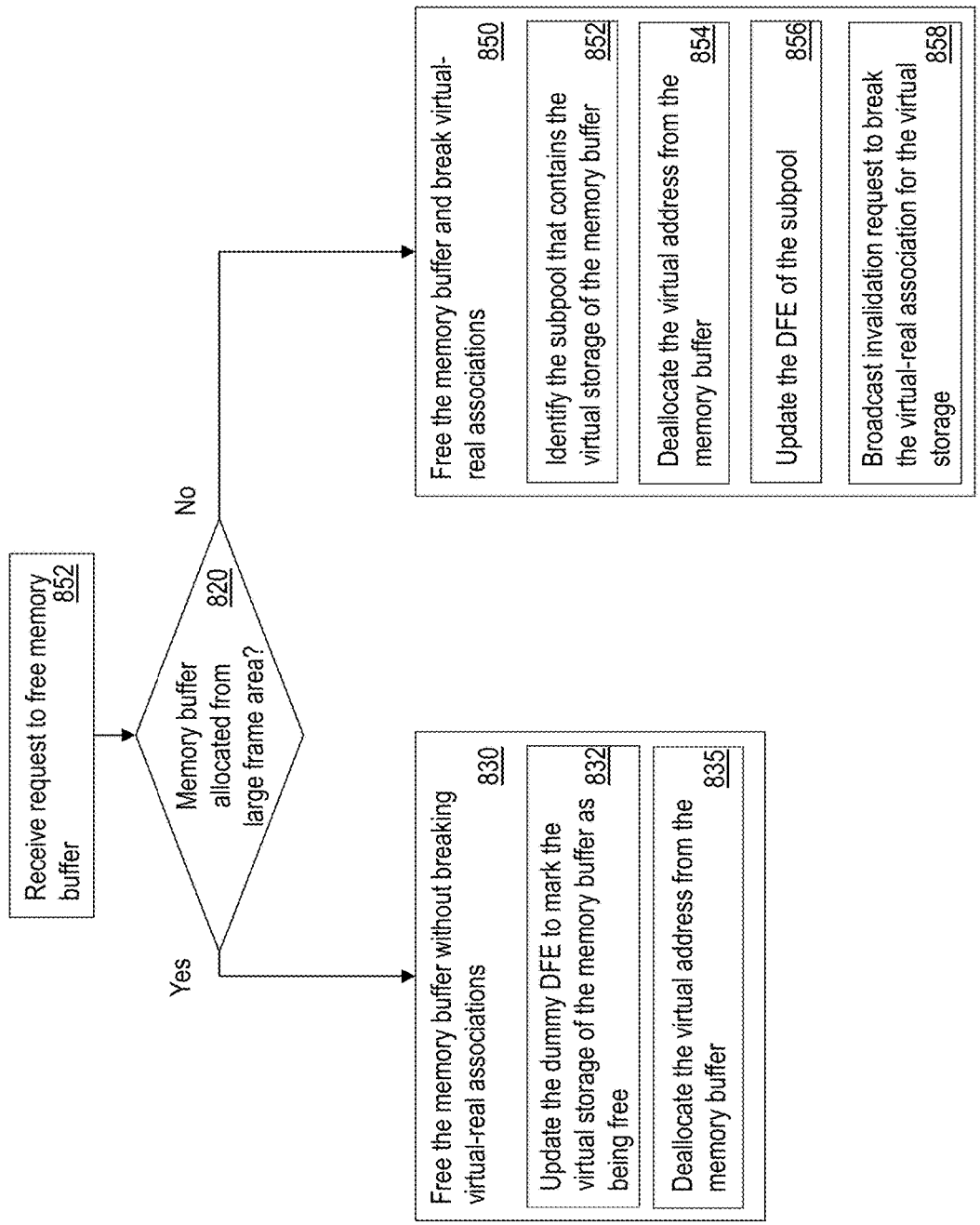
FIG. 8 illustrates a flowchart of freeing the memory buffer in accordance with an embodiment.

Subsequently, the VSM 235 receives an instruction to free the memory buffer that was allocated virtual storage from the large frame area. FIG. 8 illustrates a flowchart of freeing the memory buffer. The VSM 235 determines if the memory buffer to be freed is allocated from the large frame area, as shown at block 820. For example, the VSM 235 determines if the memory buffer is to be freed from the large frame area based on the keyword being present in the deallocation request, the keyword being identical to the keyword used in the corresponding allocation request. For example, in z/OS™, the application 120a may use a FREEMAIN LOC (31,PAGEFRAMESIZE1MB) call for freeing a memory buffer from the 31-bit common subpools. For example, the VSM 235 uses the DFE pointer from the AQAT 712 to determine if the memory buffer was allocated virtual storage from the large frame area 614 or from one of the subpools in the virtual address space 310. If the memory buffer is allocated from the large frame area 614, the VSM updates the DFE 740 to mark the virtual storage of the memory buffer as being free, that is no longer being used by the memory buffer, as shown at block 832. The memory buffer is deallocated from the virtual address, as shown at block 835. The VSM 235 does not request the RSM 237 to break the virtual-real associations of the virtual storage of the memory buffer. Thus, the VSM 235 frees the memory buffer without breaking virtual-real associations of the virtual storage, as shown at block 830.

Alternatively, if the memory buffer was allocated from one of the subpools of the virtual address space (and not the large frame area), the VSM 235 frees the virtual storage and removes the virtual-real association between the virtual storage, and the corresponding real memory frames, as shown at block 850. For example, the VSM 235 identifies the subpool that includes the virtual storage based on the AQAT 712, as shown at block 852. The VSM 235 deallocates the virtual address associated with the memory buffer and updates the DFE of the subpool to update the available virtual storage in the subpool, as shown at blocks 854 and 856. Subsequently, the operating system 130 broadcasts an invalidation request to break the virtual-real association of the virtual storage and the corresponding real memory frames, as shown at block 858.

Figure 9:
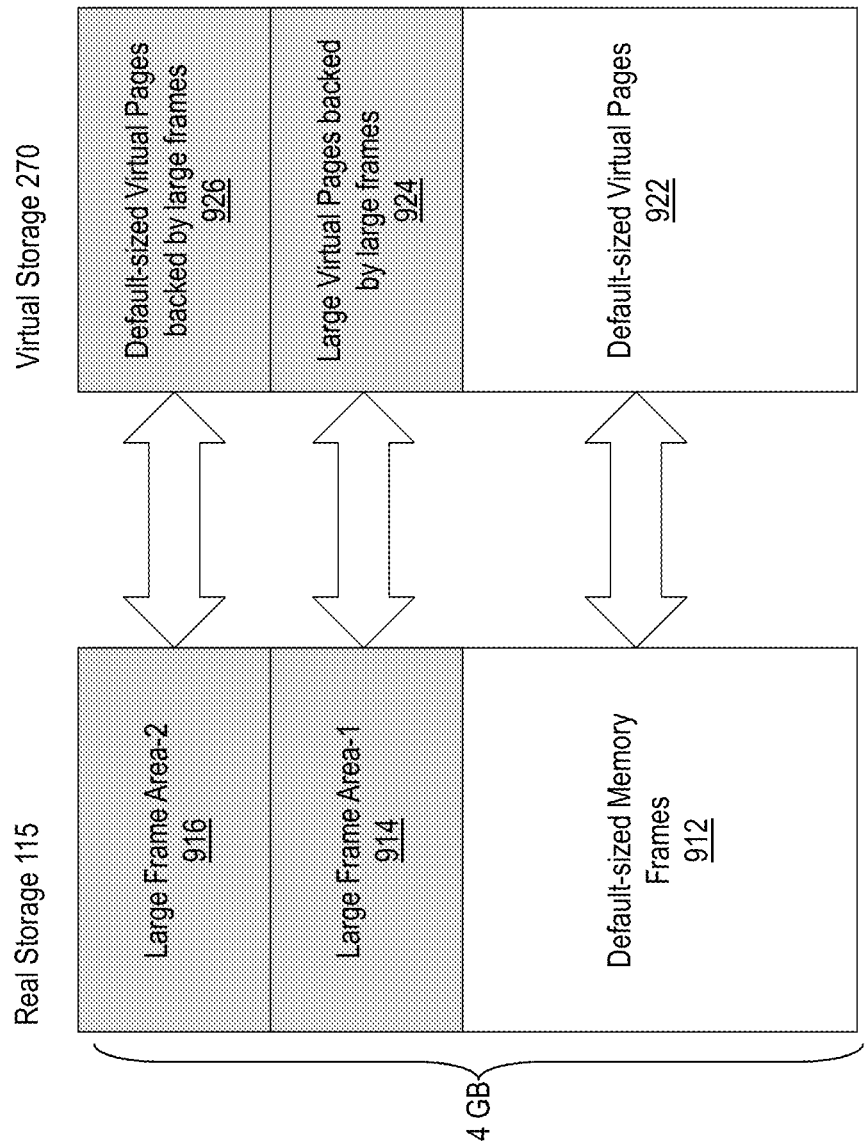
FIG. 9 illustrates a mapping between virtual storage and real storage according to another embodiment.

FIG. 9 illustrates another mapping between the virtual storage 270 and the real storage 115 according to another embodiment. In this case the operating system 130 pre-allocates a first large frame area 914 that is used to back large virtual pages 924. For example, both the large frames and the large virtual pages may be 1 MB. The operating system 130, in addition, pre-allocates a second large frame area 916 that is used to back default-sized virtual pages 926 as described herein. For example, the default-sized virtual page may be 4 KB and the large frame may be 1 MB. Further, the operating system 130 may use the rest of the real storage 115 as default-sized real memory frames 912 to back default-sized virtual memory pages 922, for example default-size being 4 KB.

The present invention may be a system, a method, and/or a computer program product at any possible technical detail level of integration. The computer program product may include a computer readable storage medium (or media) having computer readable program instructions thereon for causing a processor to carry out aspects of the present invention.

Thus, by using the 31-bit common large page area, the operating system 130 avoids broadcasting the invalidation request. The VSM 235 manages the 31-bit common large page area by updating the internal control blocks. As storage requests come in requesting 31-bit common storage that is to be backed with large frames, the VSM 235 updates the internal control blocks to distribute the virtual addresses associated with the 31-bit common large page area. Unlike 31-bit common storage requests backed with default-sized (such as 4 KB pages), the VSM 235 obtains the real frames to back the virtual storage without requesting the RSM 237, as the virtual to real association for the large frame area is already established and not broken. In addition, when requests come in to free the storage, the VSM 235 only updates the control blocks. There is, again, no call to the RSM 237 to free the frame, and thus the virtual to real association is maintained (not broken), which avoids sending a page invalidation broadcast. Accordingly, the technical solutions not only decrease TLB misses using large frames, but also reduce the page invalidation broadcasts since the virtual to real association is not broken.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for reducing page invalidation broadcasts in a computer system, the method comprising:

pre-allocating, by a real storage manager, a pool of large memory frames in real memory, wherein a large memory frame, from the pool of large memory frames, has a predetermined size that is larger than a predetermined default frame size, the pool of large memory frames having a size based on an input value at startup of the computer system, the pool of large memory frames being divided into at least a first area and a second area, wherein the first area is associated with virtual memory pages which are of the predetermined default frame size, and the second area is associated with virtual memory pages which are of the predetermined size;

receiving, by a virtual storage manager, from an application, an instruction to allocate a memory buffer, the instruction to allocate the memory buffer including a first keyword;

in response to the instruction to allocate the memory buffer comprising a request to back the memory buffer using pages of the predetermined default frame size, allocating real memory frames for the memory buffer by requesting new real memory frames from a subpool of memory frames of the predetermined default frame size to create a first allocated memory buffer, the allocation comprising creating a descriptor free element (DFE) pointer that comprises an address of the new real memory frames, a size of the memory buffer, an available contiguous memory in the subpool of memory frames of the predetermined default frame size, and a virtual address of a next free block in the subpool of memory frames of the predetermined default frame size; and in response to the instruction to allocate the memory buffer comprising a request to back the memory buffer using large pages, allocating real memory frames for the memory buffer from the pool of large memory frames to create a second allocated memory buffer without requesting new real memory frames, wherein said allocation comprises:

determining an area, from the pool of large memory frames, to use for backing the first allocated memory buffer or the second allocated memory buffer, the area determined based on the request from the instruction to allocate the memory buffer;

based on a determination that the first area is to be used, reserving a first range of contiguous virtual addresses for the memory buffer, the first range of contiguous virtual addresses corresponding to the first area from the pool of large memory frames, such that the memory buffer is associated with virtual memory pages of the predetermined default frame size and backed by one or more of the large memory frames from the first area;

based on a determination that the second area is to be used, reserving a second range of contiguous virtual addresses for the memory buffer, the second range of contiguous virtual addresses corresponding to the second area from the pool of large memory frames, such that the memory buffer is associated with virtual memory pages of the predetermined size and backed by one or more of the large memory frames from the second area;

increasing a count of a total number of memory allocation requests to use large pages, the count used to fine-tune the input value used at startup of the computer system; and creating a dummy DFE pointer in which an address of the real memory frames associated with the dummy DFE pointer and a size of a memory buffer associated with the dummy DFE pointer are absent;

receiving, from the application, an instruction to free either the first allocated memory buffer or the second allocated memory buffer based on a second keyword being present in the instruction to free either the first allocated memory buffer or the second allocated memory buffer, wherein the second keyword is identical to the first keyword; and in response to the instruction to free either the first allocated memory buffer or the second allocated memory buffer, making a range of contiguous virtual addresses reserved for either the first allocated memory buffer or the second allocated memory buffer as being free, wherein the range of contiguous virtual addresses is from the pool of large memory frames.

2. The method of claim 1, wherein the memory buffer is associated with default virtual memory pages which are smaller in size than the large memory frames.

3. The method of claim 1, wherein allocating the memory buffer from the pool of large memory frames comprises updating control blocks to mark the new real memory frames as being reserved without establishing new virtual to real associations for the new real memory frames.

4. The method of claim 1, wherein the range of contiguous virtual addresses reserved for the memory buffer is associated with an identifier of the application that requested the memory buffer.

5. The method of claim 1, wherein the virtual storage manager frees the memory buffer without broadcasting to the real storage manager a request to free real memory frames corresponding to the memory buffer.

6. The method of claim 1, further comprising:
reserving a range of contiguous virtual addresses corresponding to the pool of large memory frames, wherein allocating the memory buffer from the pool of large memory frames comprises allocating a subset of contiguous virtual addresses from the reserved range of contiguous virtual addresses for the memory buffer.

7. The method of claim 1, wherein the pool of large memory frames comprises a predetermined number of contiguous large memory frames.

8. The method of claim 1, wherein the large memory frame is a 31-bit common large page area.

9. A system comprising:
a memory; and
a processor configured to reduce page invalidation broadcasts by being configured to:
pre-allocate, at startup, a pool of large memory frames in real memory, wherein a large memory frame,. from the pool of large memory frames, has a predetermined size that is larger than a predetermined default frame size, the pool of large memory frames having a size based on an input value at startup of the system, the pool of large memory frames being divided into at least a first area and a second area, wherein the first area is associated with virtual memory pages which are of the predetermined default frame size, and the second area is associated with virtual memory pages which are of the predetermined size;
receive an instruction, from an application, to allocate a memory buffer, the instruction to allocate the memory buffer including a first keyword;
in response to the instruction to allocate the memory buffer comprising a request to back the memory buffer using pages of the predetermined default frame size, allocate real memory frames for the memory buffer by requesting new real memory frames from a subpool of memory frames of the predetermined default frame size to create a first allocated memory buffer, the allocation comprising creating a descriptor free element (DFE) pointer that comprises an address of the new real memory frames, a size of the memory buffer, an available contiguous memory in the subpool of memory frames of the predetermined default frame size, and a virtual address of a next free block in the subpool of memory frames of the predetermined default frame size; and
in response to the instruction to allocate the memory buffer comprising a request to back the memory buffer using large pages, allocate the memory buffer without requesting real memory frames to create a second allocated memory buffer, the allocation comprising:
determining an area, from the pool of large memory frames, to use for backing the first allocated memory buffer or the second allocated memory buffer, the area determined based on the request from the instruction to allocate the memory buffer;
based on a determination that the first area is to be used, reserving a first range of contiguous virtual addresses for the memory buffer, the first range of contiguous virtual addresses corresponding to the first area from the pool of large memory frames, such that the memory buffer is associated with virtual memory pages of the predetermined default frame size and backed by one or more of the large memory frames from the first area;
based on a determination that the second area is to be used, reserving a second range of contiguous virtual addresses for the memory buffer, the second range of contiguous virtual addresses corresponding to the second area from the pool of large memory frames, such that the memory buffer is associated with virtual memory pages of the predetermined size and backed by one or more of the large memory frames from the second area;
increasing a count of a total number of memory allocation requests to use large pages, the count used to fine-tune the input value used at startup of the system; and
creating a dummy DFE pointer in which an address of the real memory frames associated with the dummy DFE pointer and a size of a memory buffer associated with the dummy DFE pointer are absent;
receiving, from the application, an instruction to free either the first allocated memory buffer or the second allocated memory buffer based on a second keyword being present in the instruction to free either the first allocated memory buffer or the second allocated memory buffer, wherein the second keyword is identical to the first keyword; and in response to the instruction to free either the first allocated memory buffer or the second allocated memory buffer, making a range of contiguous virtual addresses reserved for either the first allocated memory buffer or the second allocated memory buffer as being free, wherein the range of contiguous virtual addresses is from the pool of large memory frames.

10. The system of claim 9, wherein the range of contiguous virtual addresses reserved for the memory buffer is associated with an identifier of the application that requested the memory buffer.

11. The system of claim 9, wherein the large memory frame is a 31-bit common large page area.

12. A computer program product for reducing page invalidation broadcasts in a computer system, the computer program product comprising a computer readable storage medium, the computer readable storage medium comprising computer executable instructions, wherein the computer readable storage medium comprises instructions to:
pre-allocate, at startup, a pool of large memory frames in real memory, wherein a large memory frame,. from the pool of large memory frames, has a predetermined size that is larger than a predetermined default frame size, the pool of large memory frames having a size based on an input value at startup of the computer system, the pool of large memory frames being divided into at least a first area and a second area, wherein the first area is associated with virtual memory pages which are of the predetermined default frame size, and the second area is associated with virtual memory pages which are of the predetermined size;

receive from an application, an instruction to allocate a memory buffer, the instruction to allocate the memory buffer including a first keyword;

in response to the instruction to allocate the memory buffer comprising a request to back the memory buffer using pages of the predetermined default frame size, allocate real memory frames for the memory buffer by requesting new real memory frames from a subpool of memory frames of the predetermined default frame size to create a first allocated memory buffer, the allocation comprising creating a descriptor free element (DFE) pointer that comprises an address of the new real memory frames, a size of the memory buffer, an available contiguous memory in the subpool of memory frames of the predetermined default frame size, and a virtual address of a next free block in the subpool of memory frames of the predetermined default frame size; and in response to the instruction to allocate the memory buffer comprising a request to back the memory buffer using large pages, allocate the memory buffer without requesting real memory frames to create a second allocated memory buffer, the allocation comprising:

determining an area, from the pool of large memory frames, to use for backing the first allocated memory buffer or the second allocated memory buffer, the area determined based on the request from the instruction to allocate the memory buffer;

based on a determination that the first area is to be used, reserving a first range of contiguous virtual addresses for the memory buffer, the first range of contiguous virtual addresses corresponding to the first area from the pool of large memory frames, such that the memory buffer is associated with virtual memory pages of the predetermined default frame size and backed by one or more of the large memory frames from the first area;

based on a determination that the second area is to be used, reserving a second range of contiguous virtual addresses for the memory buffer, the second range of contiguous virtual addresses corresponding to the second area from the pool of large memory frames, such that the memory buffer is associated with virtual memory pages of the predetermined size and backed by one or more of the large memory frames from the second area;

increasing a count of a total number of memory allocation requests to use large pages, the count used to fine-tune the input value used at startup of the computer system; and creating a dummy DFE pointer in which an address of the real memory frames associated with the dummy DFE pointer and a size of a memory buffer associated with the dummy DFE pointer are absent;

receiving, from the application, an instruction to free either the first allocated memory buffer or the second allocated memory buffer based on a second keyword being present in the instruction to free either the first allocated memory buffer or the second allocated memory buffer, wherein the second keyword is identical to the first keyword; and in response to the instruction to free either the first allocated memory buffer or the second allocated memory buffer, making a range of contiguous virtual addresses reserved for either the first allocated memory buffer or the second allocated memory buffer as being free, wherein the range of contiguous virtual addresses is from the pool of large memory frames.

13. The computer program product of claim 12, wherein the range of contiguous virtual addresses reserved for the memory buffer is associated with an identifier of the application that requested the memory buffer.

14. The computer program product of claim 12, wherein the pool of large memory frames is a first pool associated with a first predetermined size, the instruction received is from a first application, and wherein the computer readable storage medium comprises further instructions to:

pre-allocate, at startup, a second pool of large memory frames in the real memory, wherein a large memory frame from the second pool of large memory frames has a second predetermined size that is larger than the predetermined default frame size; and in response to the instruction to allocate the memory buffer, which comprises the request to back the memory buffer using large pages, being from a second application, allocate the memory buffer using a range of contiguous virtual addresses from the second pool of large memory frames.

\* \* \* \* \*